US010416685B2

(12) United States Patent
Mullin

(10) Patent No.: US 10,416,685 B2
(45) Date of Patent: Sep. 17, 2019

(54) INFORMATION COLLECTION SYSTEM, PUMP SYSTEM AND ASSOCIATED METHOD

(71) Applicant: Regal Beloit America, Inc., Beloit, WI (US)

(72) Inventor: Paul Steven Mullin, Yellow Springs, OH (US)

(73) Assignee: Regal Beloit America, Inc., Beloit, WI (US)

( * ) Notice: Subject to any disclaimer, the term of this patent is extended or adjusted under 35 U.S.C. 154(b) by 122 days.

(21) Appl. No.: 15/460,998

(22) Filed: Mar. 16, 2017

(65) Prior Publication Data

US 2018/0267563 A1     Sep. 20, 2018

(51) Int. Cl.
| | |
|---|---|
| G05D 7/06 | (2006.01) |
| G01M 13/00 | (2019.01) |
| G05B 19/048 | (2006.01) |
| G05B 23/02 | (2006.01) |
| G07C 3/00 | (2006.01) |

(52) U.S. Cl.
CPC .......... *G05D 7/0617* (2013.01); *G01M 13/00* (2013.01); *G05B 23/0237* (2013.01); *G05B 2219/24015* (2013.01); *G07C 3/00* (2013.01)

(58) Field of Classification Search
CPC ................. G01M 13/00; G05B 19/048; G05B 2219/24015; G05D 7/0617; F04B 23/021; F04B 23/04; F04B 49/06; F04B 51/00
See application file for complete search history.

(56) References Cited

U.S. PATENT DOCUMENTS

| | | | |
|---|---|---|---|
| 2,030,986 A | 2/1936 | Havill | |
| 2,246,276 A | 6/1941 | Davidson | |
| 4,177,021 A | 12/1979 | Niedermeyer | |
| 4,201,519 A | 5/1980 | Niedermeyer | |
| 4,730,989 A | 3/1988 | Laing | |
| 5,076,762 A | 12/1991 | Lykes et al. | |
| 8,561,502 B2 | 10/2013 | Schultz | |
| 8,689,759 B2 | 4/2014 | Schultz | |
| 10,042,341 B1 * | 8/2018 | Jacob | G06N 5/04 |
| 2006/0099090 A1 | 5/2006 | Kramp et al. | |

(Continued)

FOREIGN PATENT DOCUMENTS

| | | |
|---|---|---|
| CN | 1652328 A | 8/2005 |
| EP | 1101435 B1 | 4/2009 |

(Continued)

*Primary Examiner* — Kenneth M Lo
*Assistant Examiner* — Chad G Erdman
(74) *Attorney, Agent, or Firm* — Regal Beloit America, Inc.; John Sheldon Wagley

(57) ABSTRACT

An information collection system for a pump for removing fluid collected by a buildings drainage system from subterranean locations adjacent a building is provided. The system includes a sensor for sensing operation information regarding the operation of the pump and an information collection device operably connected to the sensor and adapted to receive the operation information. The system also includes an information storage device operably connected to the information collection device and adapted to store the operation information. The system further includes a retrieval device operably connected to the storage device and adapted to retrieve the operation information.

20 Claims, 10 Drawing Sheets

(56) References Cited

U.S. PATENT DOCUMENTS

| | | |
|---|---|---|
| 2012/0082570 A1 | 4/2012 | Schultz |
| 2013/0336804 A1* | 12/2013 | Robinson .............. F04B 49/025 |
| | | 417/22 |
| 2014/0120901 A1* | 5/2014 | Ward ...................... H04W 4/14 |
| | | 455/419 |
| 2014/0202243 A1* | 7/2014 | Leonard ................ F04B 23/021 |
| | | 73/168 |
| 2015/0110642 A1 | 4/2015 | Dahouk et al. |
| 2018/0066651 A1* | 3/2018 | Beard ....................... E03F 5/22 |

FOREIGN PATENT DOCUMENTS

| | | |
|---|---|---|
| JP | 03595706 B2 | 12/2004 |
| JP | 2010255616 A | 11/2010 |
| JP | 03174374 U | 3/2012 |
| JP | 05274524 B2 | 8/2013 |
| JP | 05364043 B2 | 12/2013 |

\* cited by examiner

```
DATA AVAILABLE FOR BUILDING

OPERATION INFORMATION OF PUMPS (INCLUDING CURRENT AND TIME PLOTTED)

PUMP MOTOR CURRENT

PUMP MOTOR VOLTAGE

PUMP MOTOR TEMPERATURE

PUMP FLOW

PUMP PRESSURE

PUMP TEMPERATURE

FLOAT LEVEL
```

FIG. 4

DATA AVAILABLE FOR LAND

LOCAL, WORLD AND REGIONAL (INCLUDING CURRENT AND TIME PLOTTED)

WEATHER

RAINFALL

SNOWMELT

AMBIENT TEMPERATURE

TOPOGRAPHY

STANDING WATER

SOIL SATURATION

FIG. 6

INFORMATION COLLECTION SYSTEM, PUMP SYSTEM AND ASSOCIATED METHOD

BACKGROUND OF THE INVENTION

The embodiments described herein relate generally to a pump, and more specifically, to an information collection system and method associated with a motor and pump.

Various types of electric machines are used to rotate a variety of devices such as pumps to generate fluid (such as water or other fluid) flow for a variety of applications. Such applications include fluid movement in subterranean application in consumer, commercial and industrial environments. One common fluid flow application is for use in residential basement and crawl space sump pump applications. The sump pump is positioned in a cylindrical pit formed in the floor of the basement. Drainage tile is typically positioned around the inner and/or, outer periphery of the foundation of the dwelling and is connected to the pit so that the accumulated subterranean water is directed into the pit.

Typically, an induction motor is connected to an impeller pump to form a device, typically called a sump pump, to generate fluid flow and to urge the pit water through a conduit and out the home. Motors typically include a rotating member (usually called a rotor) and a stationary member (usually called a stator). Motors typically utilize an electrical input to generate a magnetic field or fields to cause the rotor to rotate. Typically, the rotor and/or stator have electrical windings that use the electrical input to generate the magnetic fields. The other of the stator or rotor may have permanent magnets rather than electrical windings to provide magnetic fields. A pump having an impeller or impellers is coupled to the motor to generate the fluid flow. The impeller or impellers often extend from a shaft.

Such sump pumps are usually the sole device for the removal of subterranean water that accumulates outside and below the floor of the basement after a rainy period and in many locations that is usually present in these locations all year long. If the sump pump fails to operate, the water in the pit overflows onto the floor of the basement and may seep through the basement floor and walls into the basement. Such flooding of the basement may result in damage to the home, particularly if the basement is finished.

The sump pumps may fail causing flooding in the basement and, if the basement is finished, great damage. The motor may fail, the power may be interrupted, the pump may fail, the water conduits may be obstructed or disconnected and the pump needs may exceed the capacity of the system in extreme weather conditions.

While the status of the pump can be monitored by the homeowner when he/she is there, if the homeowner is gone, the damage from a failed pump may be extensive as no one will know it has failed. Further, if the home is repaired after a pump failure that had caused great damage, a prospective new homeowner will not be able to know of the pump failure and potential long term damage to the home that is masked by the repair.

The present invention is directed to alleviate at least some of these problems with the prior art.

BRIEF DESCRIPTION OF THE INVENTION

According to an embodiment of the present invention, an information collection system for a pump for removing fluid collected by a buildings drainage system from subterranean locations adjacent a building is provided. The system includes a sensor for sensing operation information regarding the operation of the pump and an information collection device operably connected to the sensor and adapted to receive the operation information. The system also includes an information storage device operably connected to the information collection device and adapted to store the operation information. The system further includes a retrieval device operably connected to the storage device and adapted to retrieve the operation information.

According to yet another embodiment of the present invention, the information collection system may further include a database storing device for storing comparison information related to at least one of weather, rainfall, snowmelt, ambient temperature, topography and operation information of other pumps used to remove fluid collected from subterranean locations adjacent another building. The database storing device is operably connected to the retrieval device.

According to another embodiment of the present invention, the information collection system may further include a comparing device for comparing the operation information with the comparison information.

According to another embodiment of the present invention, the information collection system may further include a motor operably connected to pump and adapted to provide energy to the pump.

According to another embodiment of the present invention, the information collection system may further include a controller operably connected to the motor and adapted to control the operation of the motor.

According to another embodiment of the present invention, the information collection system may be provided such that the sensor includes a motor current or a motor voltage sensor.

According to another embodiment of the present invention, the information collection system may be provided such that the sensor includes a controller.

According to another embodiment of the present invention, the information collection system may be provided such that the controller provides a signal indicative of at least one of a motor current or a motor voltage.

According to another embodiment of the present invention, the information collection system may be provided such that the comparing device includes a controller.

According to yet another embodiment of the present invention, the information collection system may further include a battery operably connected to the motor and adapted to provide energy to the motor.

According to another embodiment of the present invention, the information collection system may further include a second motor operably connected to the pump and adapted to provide energy to the pump.

According to another embodiment of the present invention, the information collection system may further include a clock operably connected to the information storage device. The information storage device and the clock may be configured to provide historical data related to the operational information.

According to another embodiment of the present invention, the information collection system may be provided such that the retrieval device includes a remote device.

According to another embodiment of the present invention, the information collection system may be provided such that the remote device includes the cloud, a file server, a computing device or an electronic storage device.

According to another embodiment of the present invention, the information collection system may be provided such that the comparing device is adapted to perform an evaluation of the operation information based at least in part on the comparison information.

According to another embodiment of the present invention, the information collection system may be provided such that the evaluation includes at least one of the relative state of the buildings drainage system and the effectiveness of the buildings drainage system.

According to another embodiment of the present invention, a pump system for removing fluid collected from subterranean locations adjacent a building is provided. The system includes a pump operably connected to the fluid and adapted to pump the fluid. The system also includes a pump motor operably connected to the pump and a sensor for sensing operation information regarding the operation of the pump. The system also includes an information collection device operably connected to the sensor and adapted to receive the information and an information storage device operably connected to the information collection device and adapted to store the information. The system also includes a retrieval device operably connected to the storage device and adapted to retrieve the information.

According to another embodiment of the present invention, a method for removing fluid collected from subterranean locations adjacent a building is provided. The method includes the step of pumping fluid from the surface and the step of sensing operation information regarding the pumping of the fluid from the surface. The method includes the step of collecting the operation information and the step of retrieving the operation information.

According to another embodiment of the present invention, the method may further include the step of storing comparison information related to at least one of local weather, local rainfall, local topography and operation information of other pumps used to remove fluid collected from subterranean locations adjacent another building.

According to another embodiment of the present invention, the method may further include the step of comparing the operation information with the comparison information.

BRIEF DESCRIPTION OF THE DRAWINGS

FIG. 4 is a illustrative, partial listing of data types that may be obtained from the system of present invention and available for sumps;

FIG. 6 is a illustrative, partial listing of data types that may be obtained from the system of present invention and available for real property;

DETAILED DESCRIPTION OF THE INVENTION

A motorized pump, typically called a sump pump, is often positioned in a cylindrical pit formed in the floor of a basement or crawl space of a dwelling or other building. Drainage tile is typically positioned around the inner and/or, outer periphery of the foundation of the dwelling and is connected to the pit so that the accumulated subterranean water is directed into the pit. The sump pumps may fail causing flooding in the basement and, if the basement is finished, great damage. The motor may fail, the power may be interrupted, the pump may fail, the water conduits may be obstructed or disconnected and the pump needs may exceed the capacity of the system in extreme weather conditions.

While the status of the pump can be monitored by the homeowner when he/she is there, if the homeowner is gone, the damage from a failed pump may be extensive as no one will know it has failed. Further, if the home is repaired after a pump failure that had caused great damage, a prospective new homeowner will not be able to know of the pump failure and potential long term damage to the home that is masked by the repair. Due to costs involved with the consequences of sump pump failure proved, improved monitoring of sump pump operation is desirable in sump pumps and other fluid moving devices powered by electric motors. The methods, systems, and apparatus described herein facilitate improved monitoring of an electric machine. This disclosure provides designs and methods to improve monitoring of such motors. This disclosure further provides designs and methods to improve monitoring of such motors.

Technical effects of the methods, systems, and apparatus described herein include at least one of improved performance and quality and reduced labor costs.

Figure 1:
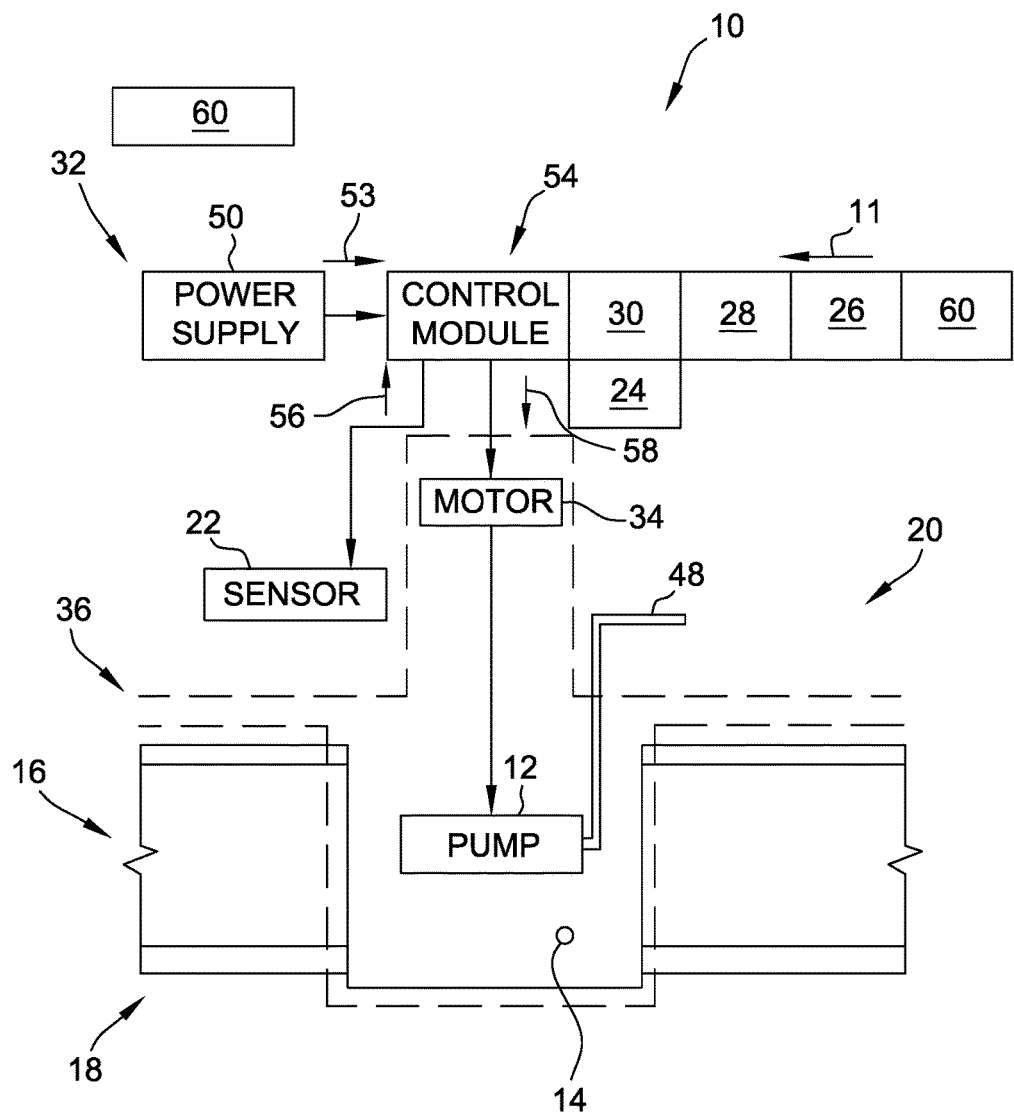
FIG. 1 is a schematic view of an embodiment of the present invention in the form of a system including a control module, interface and pumping device.

According to an embodiment of the present invention and referring to FIG. 1, an information collection system 10 for a pump 12 for removing fluid 14 collected by a building's drainage system 16 from subterranean locations 18 adjacent a building 20 is provided. The system 10 includes a sensor 22 for sensing operation information 24 regarding the operation of the pump 12 and an information collection device 26 operably connected to the sensor 22 and adapted to receive the operation information 24.

The system 10 also includes an information storage device 28 operably connected to the information collection device 26 and adapted to store the operation information 24. The system 10 further includes a retrieval device 30 operably connected to the storage device 28 and adapted to retrieve the operation information 24.

Continuing to refer to FIG. 1, it should be appreciated that the information collection system 10 may be part of a pump system 32 for removing the fluid 14 collected from subterranean locations 18 adjacent the building 20. The system 32 includes the pump 12 operably connected to the fluid 14 and adapted to pump the fluid 14.

The pump system 32 may also include a pump motor 34 operably connected to the pump 12 and sensor 22 for sensing operation information 24 regarding the operation of the pump 12. The pump system 32 may also include information collection device 26 operably connected to the sensor 22 and adapted to receive the operation information 24. The pump system 32 may also include information storage device 28 operably connected to the information collection device 26 and adapted to store the operation information 24. The pump system 32 may also include retrieval device 30 operably connected to the information storage device 28 and adapted to retrieve the operation information 24.

Continuing to refer to FIG. 1, it should be further appreciated that the pump system 32 may be part of a fluid collection system 36 for removing the fluid 14 collected from subterranean locations 18 adjacent the building 20. The fluid collection system 36 includes the pump system 32, a pit 40 for collecting the fluid 14 from the drainage system 16, as well as, the drainage system 16 for collecting the fluid 14 from the subterranean locations 18.

Figure 2:
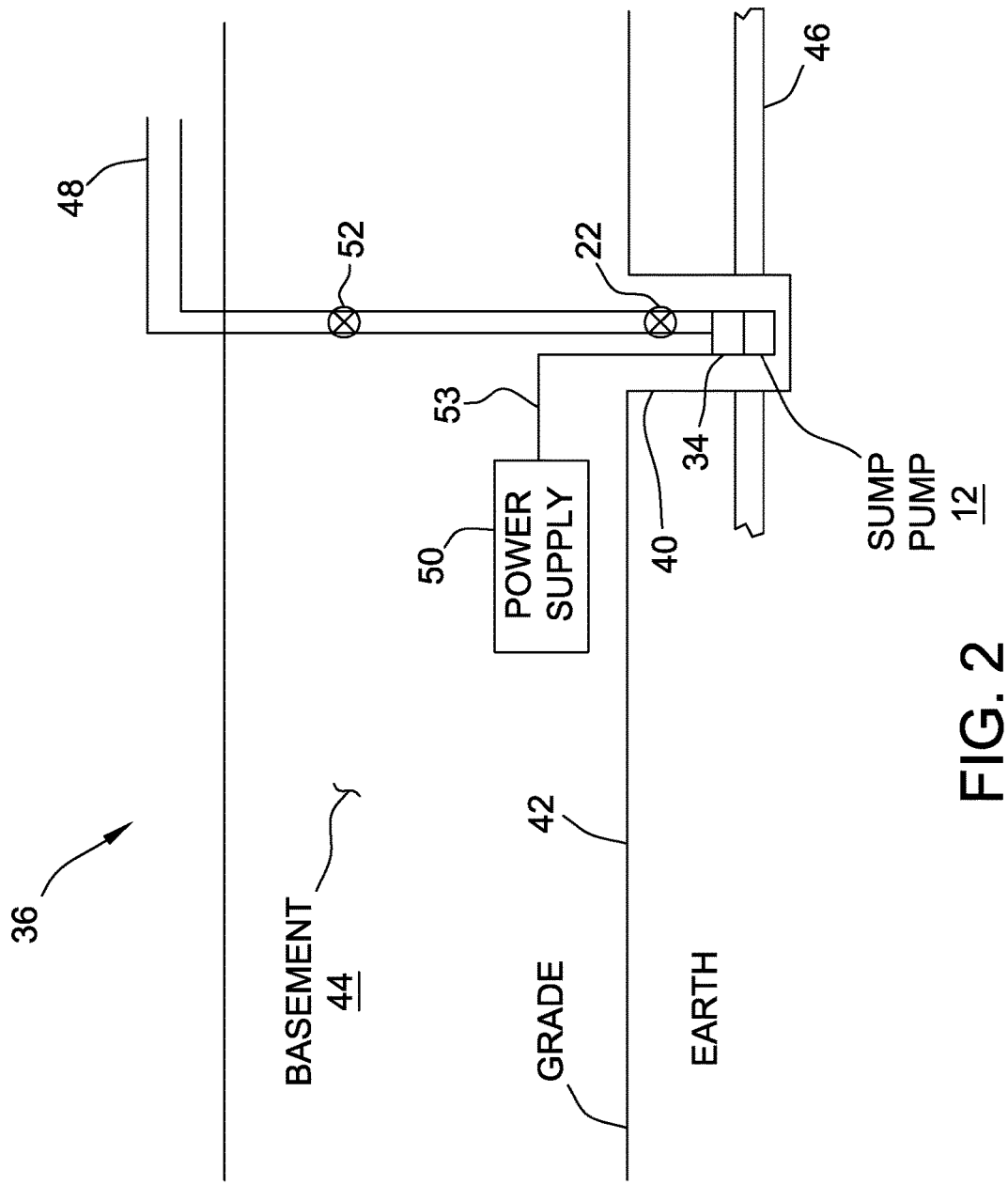
FIG. 2 is a schematic view of an embodiment of the present invention showing the system of FIG. 1 installed in a sump.

Referring now to FIG. 2, the fluid collection system 36 of FIG. 1 is shown in greater detail. The fluid collection system 36 includes pit 40 formed in floor 42 of basement 44. Drain lines 46 positioned around periphery of basement 44 are fed into pit 40 providing a conduit for subterranean water or fluid 14 to flow into the pit 40. A pump system 22 is placed in the pit 40 and is connected to discharge plumbing 48. The pump system 22 may include a pump 12 powered by electric motor 34, as disclosed as embodiments of the present invention herein. The motor 34 is powered by power supply 50. Electrical lines 53 connect the power supply 50 to the motor 34. A check valve 52 is placed in the discharge plumbing 48 to prevent water 14 from returning to the pit 40 when the pump 12 is not running.

The power supply 50 may be a residential or commercial power supply, for example 110V AC or 220V AC from a power utility. Alternately the power supply 50 may be back up power from for example a generator or a battery. The battery may be a dry or liquid battery and may be rechargeable or not rechargeable. The battery may include rare earth metals. Note, each of the power supply 50 may include any combination of the aforementioned power supplies.

Figure 2A:
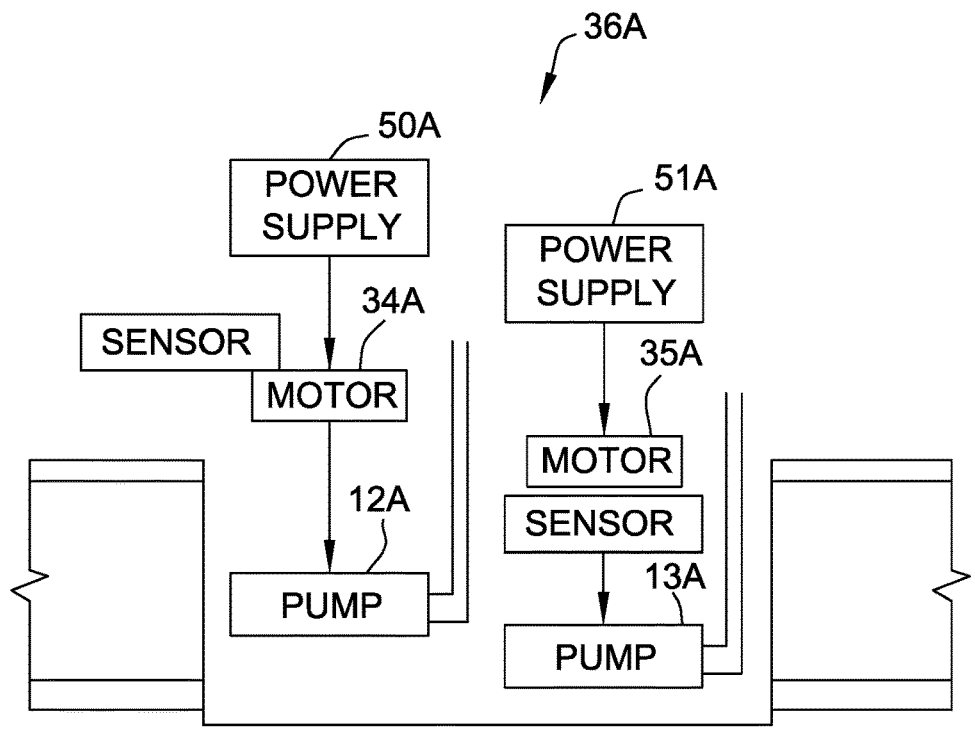
FIG. 2A is a schematic view of another embodiment of a system according to the present invention installed in a sump and having two pumps and two pump motors.

Referring now to FIG. 2A, another embodiment of a fluid collection system according to the present invention is shown as the fluid collection system 36A. Fluid collection system 36A includes a second motor 35A. The second motor 35A is operably connected to second pump 13A and adapted to provide energy to the pump 13A. Fluid collection system 36A also includes first motor 34A. The first motor 34A is operably connected to the pump 12A and adapted to provide energy to the pump 12A.

The first motor 34A may be connected to first power supply 50A and the second motor 35A may be connected to second power supply 51A. The power supplies 50A and 51A may be a residential or commercial power supply, for example 110V AC or 220V AC from a power utility. Alternately the power supplies 50A and 51A may be back up power from for example a generator or a battery. Note each of the power supplies 50A and 51A may include any combination of the aforementioned power supplies.

Figure 2B:
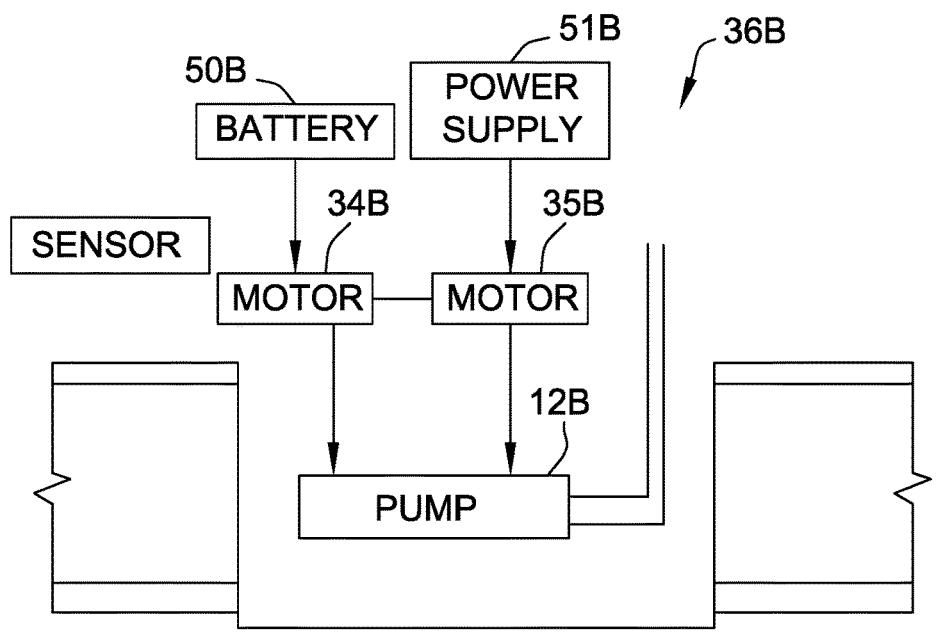
FIG. 2B is a schematic view of another embodiment of a system according to the present invention installed in a sump and having two pump motors.

Referring now to FIG. 2B, another embodiment of a fluid collection system according to the present invention is shown as the fluid collection system 36B. Fluid collection system 36B includes a second motor 35B. The second motor 35B is operably connected to the pump 12B and adapted to provide energy to the pump 12B. Fluid collection system 36B also includes first motor 34B. The first motor 34B is operably connected to the pump 12B and adapted to provide energy to the pump 12B. The first motor 34B may be connected to first power supply 50B and the second motor 35B may be connected to second power supply 51B. The power supplies 50B and 51B may be a residential or commercial power supply, for example 110V AC or 220V AC from a power utility. Alternately the power supplies 50B and 51B may be back up power from for example a generator or a battery. As shown in FIG. 2B, first power supply 50B is a battery. Note, each of the power supplies 50B and 51B may include any combination of the aforementioned power supplies.

Figure 3:
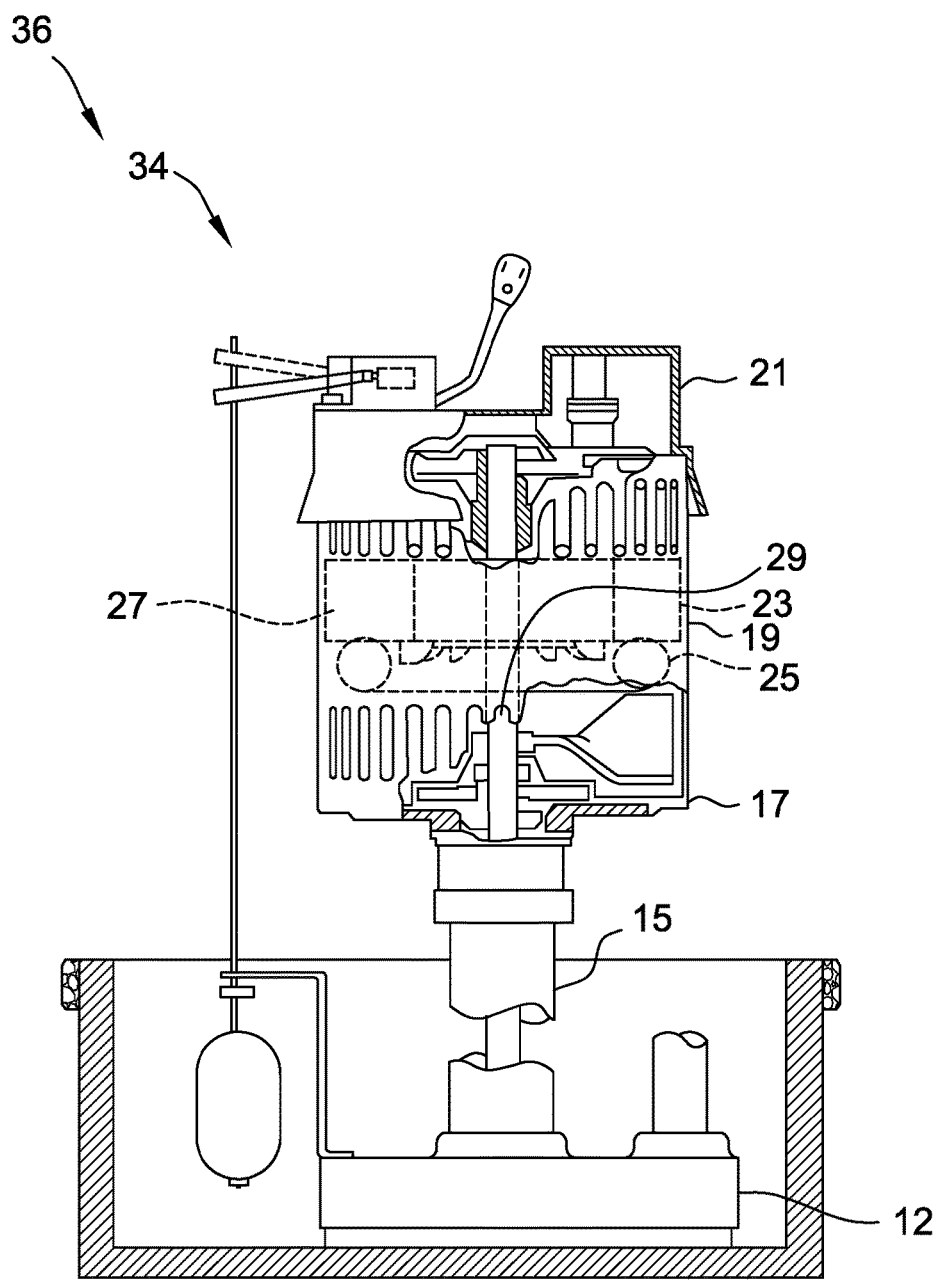
FIG. 3 is a plan view of an embodiment of the present invention showing the pumping device of the system of FIG. 1.

Referring now to FIG. 3, motor 34 of the fluid collection system 36 is shown in greater detail. While the motor 34, as shown in FIG. 3, is an induction motor, it should be appreciated that the motor or motors utilized in the fluid collection system of the present invention may be any motor or motors that may be suitable for powering a pump to move fluids.

For example, the motor may be an electronically commutated motor hereinafter referred to as an ECM motor. The motor may be a brushless alternating current motor, a brushless direct current motor, or a switched reluctance motor. An ECM motor may include a trapezoidal drive or a sinusoidal drive. Further an ECM motor may have a radial or an axial airgap.

For example, the motor or motors may be any of the various motors or combination of motors as disclosed in U.S. Patent Application Publication US 2015/0110642 Published Apr. 23, 2015 for "PUMP, ASSOCIATED ELECTRIC MACHINE AND ASSOCIATED METHOD", which is hereby incorporated by reference in its entirety.

The motor 34, as shown in FIG. 3, is an induction motor. The motor may be of the type of pump motor described in U.S. Pat. No. 5,076,762A issued Dec. 31, 1991 for "VERTICAL SUMP PUMP MOTOR", which is hereby incorporated by reference in its entirety. The motor 34 may be secured to pump 12 by an upstanding pedestal pipe 15 on the pump 12. Pedestal pipe 15 is supported by the pump 12. The motor 34 may be a standard fractional horsepower motor with sump pump adaptors to adapt the motor 34 for operation in the environment of a sump pump unit. The fractional horsepower motor 34 includes a cylindrical main frame 19 enclosed at the opposite ends in end bearing frames 17 and 21.

In accordance with known constructions, a stator unit 23 is secured within the main frame 19 having winding 25 which includes a run winding and a start winding. A rotor 27 is rotatably mounted within the stator unit 23 with its shaft 29 supported by bearings located in the respective end bearing frames 17 and 21. The shaft 29 terminates within the upper bearing frame 17. The opposite end of the shaft 29 extends outwardly from the corresponding bearing frame for interconnection to the pump shaft. The main frame 19 has top and bottom side openings to allow cooling air flow through the motor. The motor 34 may include a fan unit mounted within the motor to establish forced cooling of the motor 34.

Referring again to FIG. 1, the information collection system 10 may be used to provide input 11 to assist in managing the fluid collection system 36. The input 11 provided by the information collection system 10 may be collected and processed by, for example, a controller, computer or control module 54.

The input 11 may be current or historical information about the fluid collection system 36, current or historical information about another fluid collection system or systems, and/or current or historical information about the environment or anything else. The input 11 may also be a compilation, product, interpolation, extrapolation and/or other manipulation of the information.

It should be appreciated that the input 11 may be utilized to manage other data collection systems installed in other building or for other purposes related to pump usage, precipitation, water accumulation, flooding, flood control, ground water saturation, soil condition, wetland preservation, construction site moisture, farm field readiness for soil preparation, farm land valuation, commercial property land valuation, residential building land valuation and/or suitability of land for development.

It should be appreciated that the control module or controller 54 may be operably connected to the motor 34 and adapted to control the operation of the motor 34.

It should be appreciated that the information collection system may be configured such that the fluid collection system 36 may include sensor 22. The sensor 22 may be any device capable of sensing a characteristic of an object or a phenomenon. The characteristic or phenomenon may be proximity, magnetic field, light, current, voltage, pressure, flow, motion, temperature, or any other characteristic or phenomenon. The sensor may, for example, be a proximity sensor, magnetic field sensor, light sensor, current sensor, voltage sensor, pressure sensor, flow sensor, motion sensor, and/or temperature sensor. Additional sensors (not shown) may be used in the information collection system 10.

It should be appreciated that the sensor 22 may include the controller 54 or that the controller 54 may include a sensor 22 and/or other sensors.

It should be appreciated that the sensor 22 may be positioned anywhere in the fluid collection system 36 or in the information collection system 10. Typically the sensor 22 is positioned in or adjacent the location of the object or phenomenon. For example, if the sensor 22 is configured to measure the fluid 14, the sensor may be positioned in or adjacent the pump 12, the drainage system 16 and/or the discharge plumbing 48. For example, if the sensor 22 is configured to measure the electrical energy conveyed in the electrical lines 53, the sensor may be positioned in or adjacent the electrical lines 53.

The information collection system 10 of the present invention may be utilized to collect information or input 11 related to the fluid collection system 36 for storage and later retrieval for any of a number of purposes and/or to collect information or input 11 related to the fluid collection system 36 over time and to process that information to make adjustments over time to the operation of the fluid collection system 36.

Continuing to refer to FIG. 1, the information collection system 10 of the present invention may be utilized to collect information or input 11 related to the fluid collection system 36 for storage and later retrieval by first collecting input 11 from the sensor 22 and converting that input 11 to an electric input signal 56 that is transmitted to the control module 54. The electric input signal 56 or an equivalent signal is sent on to the information collection device 26 within the control module 54. The information collection device 26 passes the electric input signal 56 or an equivalent signal on to the information storage device 28 within the control module 54. When input 11 from the sensor 22 corresponding to the electric input signal 56 is desired, the retrieval device 30 is utilized to retrieve the input 11 corresponding to the electric input signal 56.

The retrieval device 30 may be any device that may extract electric input signal 56 or its equivalent signal from the control module 54. The retrieval device 30 may be a volt/ohm meter or more complicated device that can read and/or extract the electric input signal 56 or its equivalent signal from the control module 54. The retrieval device 30 may be directly connectable to the control module 54 or the retrieval device 30 may include a remote or wireless device 60. The remote device 60 may, for example, use wi/fi signals, NFC signals or any other applicable signals. The remote device 60 may, for example, include the cloud, a file server, a computing device or an electronic storage device.

Continuing to refer to FIG. 1, the information collection system 10 of the present invention may be utilized to collect information or input 11 related to the fluid collection system 36 over time and to process that information to make adjustments over time to the operation of the fluid collection system 36. First input 11 is collected from the sensor 22 and converted to an electric input signal 56 that is transmitted to the control module 54. The electric input signal 56 or an equivalent signal is sent on to the information collection device 26 within the control module 54. The electric input signal 56 is passed by the information collection device 26 as the electric input signal 56 or an equivalent signal on to the information storage device 28 within the control module 54. The controller then utilizes the electric input signal 56 as an input in an algorithm and later sends a command signal 58 to the motor 34 to provide a changed operation of the motor 34 of the fluid collection system 36.

The information collection system 10 may further include a clock 60 operably connected to the information storage device 10. The information storage device 10 and the clock 60 may be configured to provide historical data related to the operational information. The electric input signals 56 may be tagged with times provided by the clock 60 to provide each signal 56 with the exact time it was generated.

The information collection system of the present invention may be utilized to collect information or input related to the fluid collection system over time. The information collection system may be used to compile information or data about the use of a device, such as a sump pump.

The information, for example and as shown in FIG. 4, may include, for example, pump motor current, pump motor voltage, pump motor temperature, pump flow, pump pressure, pump temperature, float level.

This information may be used by the homeowner to monitor the sump pump. Measuring pump flow or current, for example, may be used to determine the use of the motor and possible preventive maintenance of the sump pump or motor.

This information may also be used by a prospective home buyer to verify that the basement or crawl space has been continuously protected by a sump pump and that the basement or crawl space has not been subjected to a flood that might have caused undetectable damage such as mold or rot.

Figure 5:
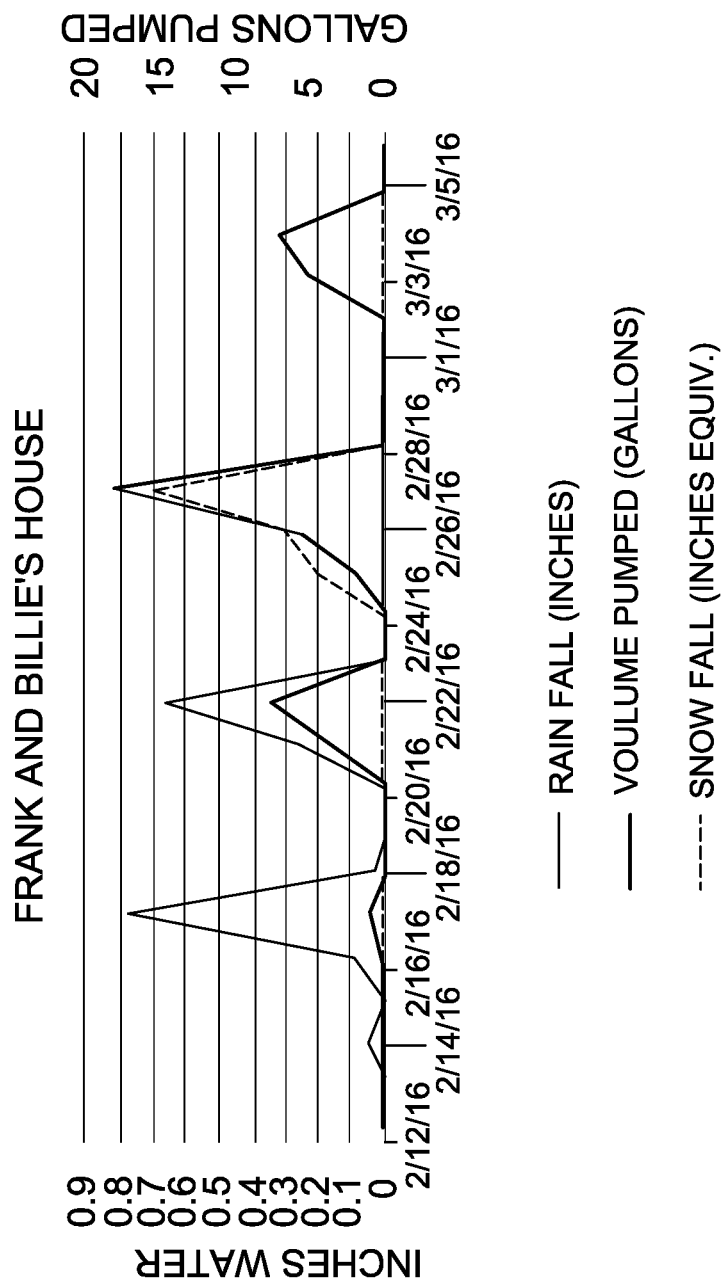
FIG. 5 is a graph of data output available with the use of data collection using the system of the present invention according to another embodiment of the present invention.

For example and as shown in FIG. 5, the compile information or data about the use of a device may be provided in graphical form so that the homeowner or prospective buyer can quickly view the history of the use of the sump pump.

While the information collection system of the present invention may be utilized to operate the fluid collection system independently of other input external to the fluid collection system, the information collection system may interact with external inputs to enhance the operation of the fluid collection system and to enhance the input that may be collected by the information collection system.

Figure 2C:
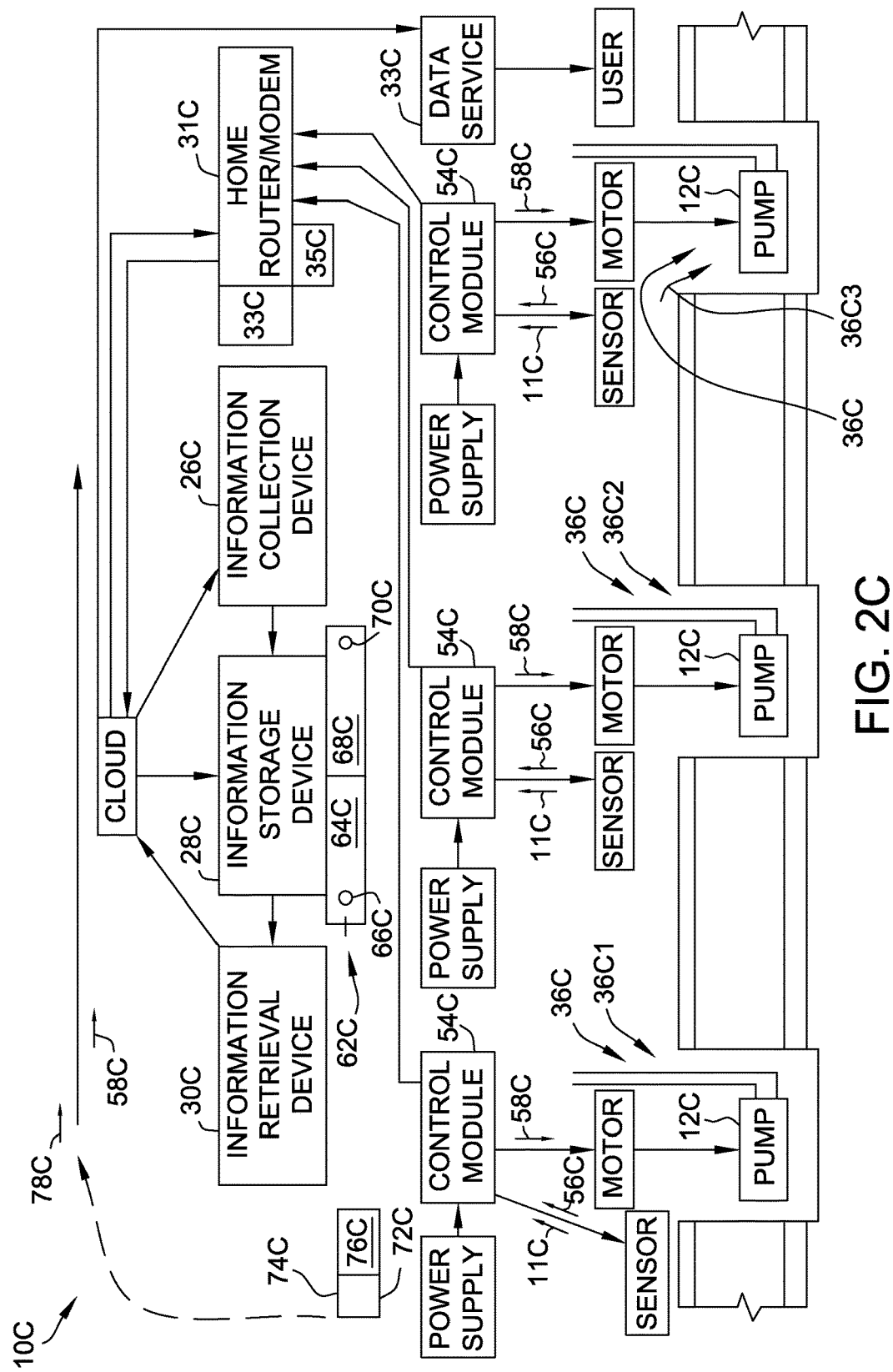
FIG. 2C is a schematic view of another embodiment of a system according to the present invention servicing a plurality of sumps.

For example and referring now to FIG. 2C, information collection system 10C of the present invention may be utilized to collect information 11C from a plurality of spaced apart fluid collection systems, for example first fluid collection systems 36C1, second fluid collection systems 36C2 and third fluid collection system 36C3. Each of the fluid collection systems 36C1, 36C2 and 36C3 may be located in the same or in different buildings that may be located different parts of the world. Each of the fluid collection systems 36C1, 36C2 and 36C3 includes a system controller or control module 54C that receives input signals 56C from sensors 22C and those signals or their equivalents to an information collection device 26C.

While it should be appreciated that the signals 56C may be physically extracted manually from the controllers 54C and sent manually, physically or electronically to the information collection device 26C, either at the separate sites and later sent manually, physically or electronically on to a common remote information storage device 28C, for simplicity and to utilize available technology, the information collection device 26C and the information storage device 28C may be located in the "cloud" or the signals 56C may be transmitted via the internet to remote storage and processing facilities which will provide the information collection device 26C and the information storage device 28C. An information retrieval device 30C may also be located in the cloud and is used to retrieve information in the cloud and send it back to the home/router/modem 31 or to the Data Service 33C.

The information storage device 28C may collect signals 56C from many, perhaps thousands or millions of fluid collection systems 36C. The information collection system 10C may further include database storing device 62C including an operation information database storing portion 64C for storing operation information 66C obtained from the signals 56C of pumps 12C used around the country and/or world to remove fluid collected from subterranean locations adjacent another building database. The database storing device 62C may also include comparison information storing portion 68C storing comparison information 70C related to at least one of weather, rainfall, snowmelt, ambient temperature, topography.

The information collection system 10C may further include a comparing device 72C for comparing the operation information 66C with the comparison information 70C. It should be appreciated that the comparing device 72C may include a computer or controller 74C that may provide optimum command signals 58C for each of the fluid collection systems 36C.

The information retrieval device 30C of the information collection system 10C may send data signals 78C to the modem 31 or to a data service 33C which may be access by a user 35C that may or may not be related to a sump pump installation.

It should be appreciated that the information collection system 10C may be provided such that optimum command signals 58C are formulated by having the comparing device 72C perform an evaluation 76C of the operation information 66C based at least in part on the comparison information 70C.

It should be appreciated that the information collection system 10C may be provided such that the evaluation 76C includes at least one of the relative state of the buildings drainage system and the effectiveness of the buildings drainage system.

Figure 7:
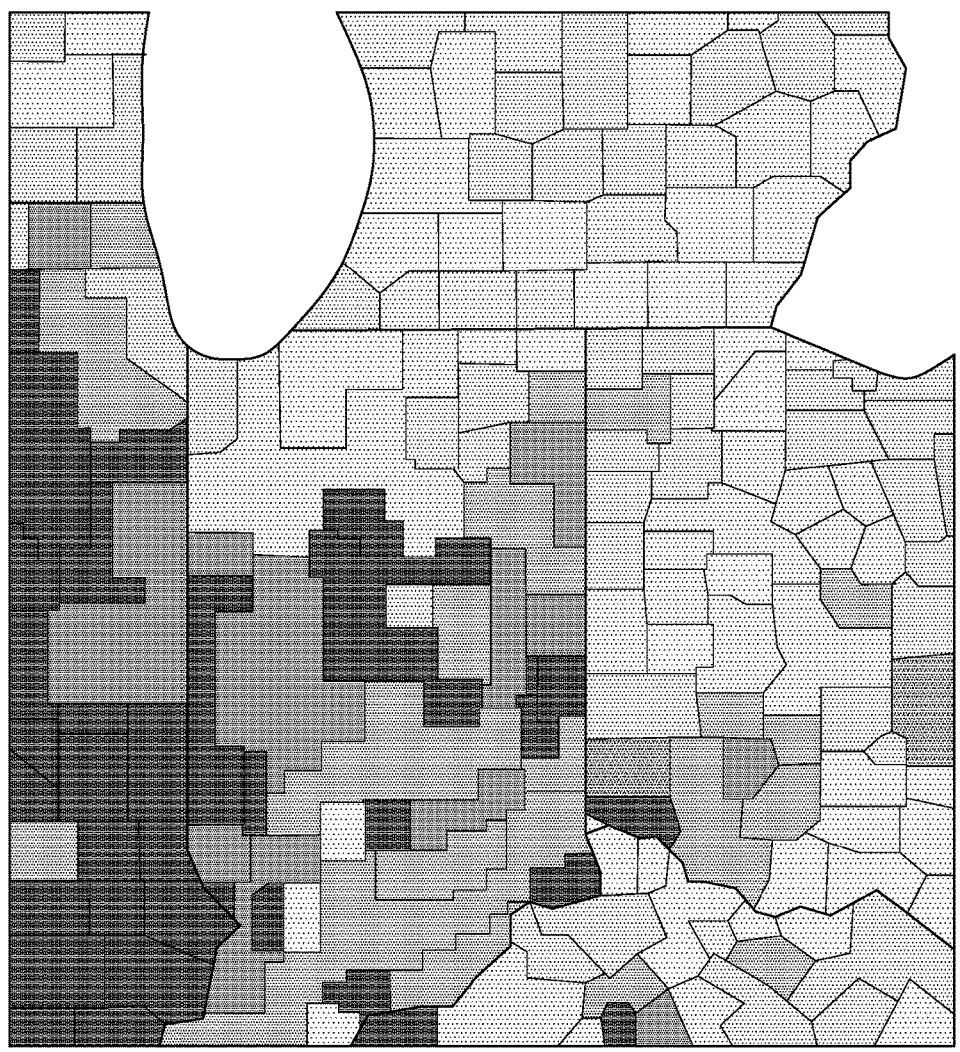
FIG. 7 is a sample illustrative map of real property with moisture data obtained from the system of present invention.

Referring now to FIGS. 6 and 7, the information collection system 10C may be utilized to collect information, data or input related to the fluid collection systems over time and over a wide range of locations. This data over time may be processed and made available to a wide variety of potential users including the sump pump owners as well as other individuals who would benefit from such data.

The information collection system may be used to compile information or data about the use of the networks of sump pumps located at in many locations. The information for example and as shown in FIG. 4 may include, for example, pump motor current, pump motor voltage, pump motor temperature, pump flow, pump pressure, pump temperature, float level.

In addition to the information about the sump pumps, the information collection system may also collect data for sources other than the sump pumps. For example and referring now to FIG. 6, the information collection system may collect local, world and regional data, from any available source, including current and time plotted information about weather, rainfall, snowmelt, ambient temperature, topography, standing water and soil moisture or saturation.

Referring now to FIG. 7, current soil moisture is shown graphically for a portion of the Midwest portion of the US. Note, moister areas are shown shaded more darkly. For example, the shading may be used as an indication if outdoor activity, such as construction and farming, can be currently performed, in light of the moisture.

The data as listed in FIGS. 6 and 7, and related data may be provided for a fee or in a site that generates revenue from, for example, advertising, diverted internet traffic or direct sales. Sample groups interested in such data may be homeowners, builders, highway construction companies, commercial property owners, farmers, ranchers, athletes, sports and outdoor enthusiasts, developers, realtors, and government agencies.

Figure 8:
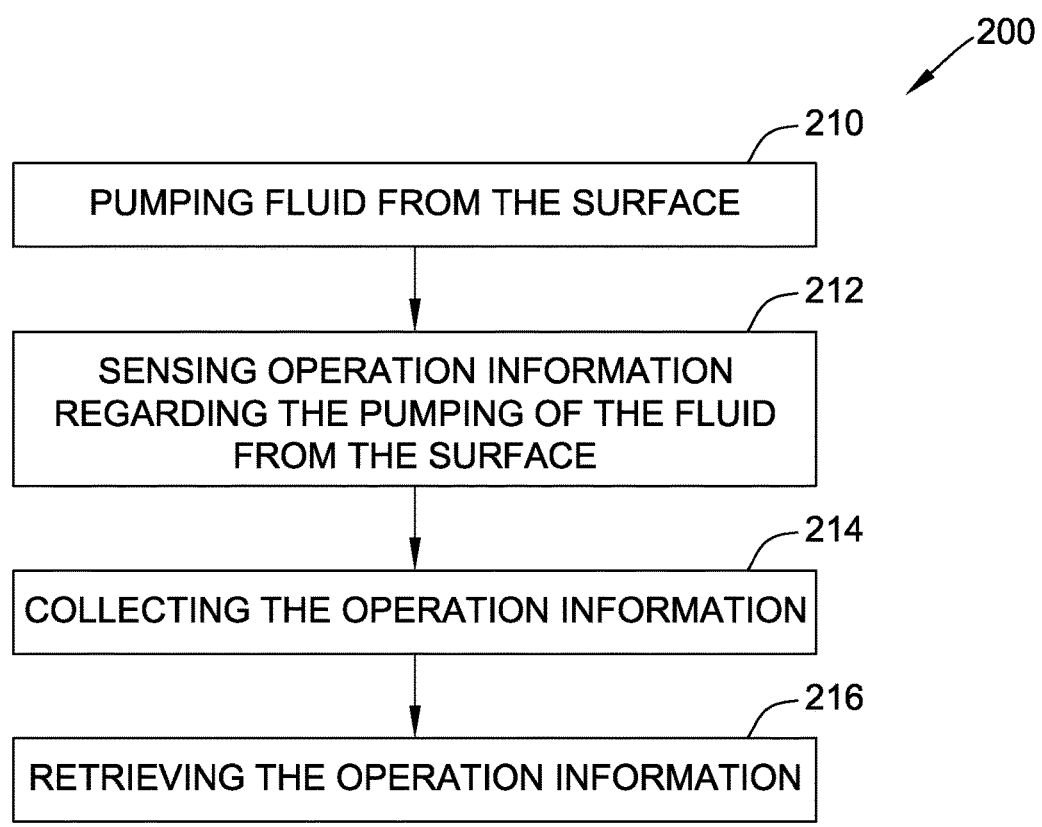
FIG. 8 is a flow chart of a method of using a system and its data according to another embodiment of the present invention.

According to another embodiment of the present invention and referring now to FIG. 8, a method 200 for removing fluid collected from subterranean locations adjacent a building is provided. The method 200 includes step 210 of pumping fluid from the surface and step 212 of sensing operation information regarding the pumping of the fluid from the surface. The method includes step 214 of collecting the operation information and the step 216 of retrieving the operation information.

According to another embodiment of the present invention, the method may further include the step of storing comparison information related to at least one of local weather, local rainfall, local topography and operation information of other pumps used to remove fluid collected from subterranean locations adjacent another building.

According to another embodiment of the present invention, the method may further include the step of comparing the operation information with the comparison information.

The methods, systems, and apparatus described herein facilitate efficient and economical assembly of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus that may be used to collect data about the environment, about pump and motor usage both over time and geographic regions. Furthermore, the exemplary methods system and apparatus achieve added security to homeowners and to potential home buyers. The methods, system and apparatus described herein may be used in any suitable application. However, they are particularly suited for sub pump applications.

Exemplary embodiments of the fluid flow device and system are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An information collection system for a pump for removing fluid collected by a buildings drainage system from a subterranean location adjacent a building, the system comprising:
   a sensor for sensing pump operation information regarding the operation of the pump;
   an information collection device operably connected to the sensor and adapted to receive the pump operation information;
   an information storage device operably connected to the information collection device and adapted to store the pump operation information;
   a retrieval device operably connected to the storage device and adapted to retrieve the pump operation information,
   a database storing device for storing comparison information including soil saturation information related to soil saturation of the subterranean location adjacent the building, for storing saturation information related to soil saturation of the subterranean locations of a network of sump pumps located throughout a geographical region, and for storing pump operational information of other pumps of the network of sump pumps located throughout the geographical region, said database storing device operably connected to the retrieval device; and
   a comparing device for comparing the pump operation information with the comparison information, wherein said comparing device is adapted to perform an evaluation of the pump operation information based at least in part on the comparison information, the evaluation resulting in the sending of command signals for operation of the pump, wherein the evaluation includes at least one of the relative state of the buildings drainage system and the effectiveness of the buildings drainage system.

2. The information collection system as in claim 1, further comprising a motor operably connected to pump and adapted to provide energy to the pump.

3. The information collection system as in claim 2, further comprising a controller, said controller operably connected to the motor and adapted to control the operation of said motor.

4. The information collection system as in claim 1, wherein the sensor comprises one of a motor current or a motor voltage sensor.

5. The information collection system as in claim 1, wherein the sensor comprises a controller.

6. The information collection system as in claim 4, wherein the controller provides a signal indicative of at least one of a motor current or a motor voltage.

7. The information collection system according to claim 1, wherein said comparing device comprises a controller.

8. The information collection system according to claim 2, further comprising a battery operably connected to said motor and adapted to provide energy to said motor.

9. The information collection system according to claim 2, further comprising a second motor operably connected to the pump and adapted to provide energy to the pump.

10. The information collection system according to claim 1, further comprising a clock operably connected to said information storage device, said information storage device and said clock configured to provide historical data related to the operational information.

11. The information collection system according to claim 1, wherein said retrieval device comprises a remote device.

12. The information collection system according to claim 11, wherein said remote device comprises one of the cloud, a file server, a computing device an electronic storage device.

13. A pump system for removing fluid collected from a subterranean location adjacent a building with a building drainage system, the pump system comprising:
   a pump operably connected to the fluid and adapted to pump the fluid;
   a pump motor operably connected to said pump;
   a sensor for sensing pump operation information regarding the operation of the pump;
   an information collection device operably connected to the sensor and adapted to receive the pump operation information;

an information storage device operably connected to the information collection device and adapted to store the pump operation information;

a retrieval device operably connected to the storage device and adapted to retrieve the pump operation information;

a database storing device for storing comparison information including soil saturation information related to soil saturation of the subterranean location adjacent the building, for storing saturation information related to soil saturation of the subterranean locations of a network of sump pumps located throughout a geographical region, and for storing pump operational information of other pumps of the network of sump pumps located throughout the geographical region, said database storing device operably connected to the retrieval device; and a comparing device for comparing the pump operation information with the comparison information, wherein said comparing device is adapted to perform an evaluation of the pump operation information based at least in part on the comparison information, the evaluation resulting in the sending of command signals for operation of the pump, wherein the evaluation includes at least one of the relative state of the buildings drainage system and the effectiveness of the buildings drainage system.

14. A method for removing fluid collected from a subterranean location adjacent a building, the method comprising the steps of:

pumping fluid from the surface with a building pump;

sensing subterranean location information including operation information of the pump regarding the pumping of the fluid from the surface and information related to soil saturation of the subterranean location adjacent the building;

collecting the subterranean location information;

retrieving the subterranean location information;

storing comparison information related to soil saturation of the subterranean location adjacent the building, related to soil saturation of the subterranean locations of a network of sump pumps located throughout a geographical region, and related to operation information of other pumps of the network of sump pumps located throughout the geographical region;

compiling the subterranean location information and the comparison information over time into a compilation; and offering the compilation to at least one of the sump pump owners and other individuals who would benefit from the compilation.

15. The information collection system according to claim 1, wherein the geographical region is one of world wide, Midwest, state and city wide.

16. The information collection system according to claim 1, wherein the comparison information related to soil saturation of the subterranean location comprises at least one of weather, rainfall, snowmelt, ambient temperature, topography.

17. The pump system according to claim 13, wherein the geographical region is one of world wide, Midwest, state and city wide.

18. The pump system according to claim 13, wherein the comparison information related to soil saturation of the subterranean location comprises at least one of weather, rainfall, snowmelt, ambient temperature, topography.

19. The method as in claim 14, wherein the compilation is in the form of one of tables, charts, graphs, warnings and reports.

20. The method as in claim 14, further comprising the steps of:

performing an evaluation of the operation information of the pump based at least in part on the comparison information; and sending command signals for operation of the pump based at least in part on the evaluation, wherein the evaluation includes the soil saturation.

* * * * *